(12) United States Patent
Mattana

(10) Patent No.: US 11,170,820 B1
(45) Date of Patent: Nov. 9, 2021

(54) METHOD AND APPARATUS FOR RECORDING AUDIO INFORMATION

(71) Applicant: Logitech Europe S.A., Lausanne (CH)

(72) Inventor: Anthony Mattana, Libertyville, IL (US)

(73) Assignee: LOGITECH EUROPE S.A., Lausanne (CH)

( * ) Notice: Subject to any disclaimer, the term of this patent is extended or adjusted under 35 U.S.C. 154(b) by 0 days.

(21) Appl. No.: 17/025,150

(22) Filed: Sep. 18, 2020

(51) Int. Cl.
| | |
|---|---|
| G11B 27/24 | (2006.01) |
| G06F 3/16 | (2006.01) |
| G11B 27/34 | (2006.01) |
| H04N 5/765 | (2006.01) |
| G11B 27/031 | (2006.01) |
| H04W 4/80 | (2018.01) |

(52) U.S. Cl.
CPC .............. *G11B 27/24* (2013.01); *G06F 3/162* (2013.01); *G11B 27/031* (2013.01); *G11B 27/34* (2013.01); *H04N 5/765* (2013.01); *H04W 4/80* (2018.02)

(58) Field of Classification Search
CPC .................................................... G11B 27/24
USPC ......................................................... 386/207
See application file for complete search history.

(56) References Cited

U.S. PATENT DOCUMENTS

| | | | |
|---|---|---|---|
| 9,748,913 B2 | 8/2017 | Kim et al. | |
| 2016/0057527 A1 | 2/2016 | Mattana | |
| 2017/0034575 A1* | 2/2017 | Hongo | ................ H04N 21/439 |
| 2017/0094412 A1 | 3/2017 | Mattana | |
| 2017/0150266 A1 | 5/2017 | Mattana | |
| 2018/0279048 A1 | 9/2018 | Mattana | |

(Continued)

FOREIGN PATENT DOCUMENTS

WO    2014/200693 A1    12/2014

OTHER PUBLICATIONS

"SabineTek SmartMike+ Wireless Lavalier Microphone, Rechargeable Bluetooth Clip-on Lapel Mic Noise Cancellation for iPhone Android iPad Video Recording Interview Teaching Podcast Vlogging (Black)", https://www.amazon.com/SabineTek-SmartMike-Microphone-Rechargeable-Cancellation/dp/B082HW6MZB.

(Continued)

*Primary Examiner* — Daniel T Tekle
(74) *Attorney, Agent, or Firm* — Patterson & Sheridan, LLP

(57) ABSTRACT

A method and apparatus for recording audio information are provided. The method may include: receiving the first audio information from an external source; communicating with a device that is configured to record video information of the object; generating an audio backup data by storing the first audio information in memory as the device starts recording the video information; receiving the second audio information when the device stops recording the video information; determining whether the first audio information matches the second audio information at a predetermined point of time by comparing a first amount of audio data included in the first audio information with a second amount of audio data included in the second audio information; generating synchronized audio information by aligning the first audio information with the second audio information based on the stored first audio information; and transmitting the synchronized audio information.

20 Claims, 9 Drawing Sheets

(56) References Cited

U.S. PATENT DOCUMENTS

2021/0083783 A1* 3/2021 Stilwell .................. H04R 5/02

OTHER PUBLICATIONS

Sabinetek. SabineTek SmartMike+™ Bluetooth HiFi Quality Wireless Stereo Lavalier Microphone. https://www.sabinetek.com/products/smartmikeplus.

Kickstarter, SmartMike+: True Wireless Stereo Mic for Content Creators https://www.kickstarter.com/projects/sabinetek/smartmike-revolutionary-wireless-mic-for-content-creators/posts.

* cited by examiner

METHOD AND APPARATUS FOR RECORDING AUDIO INFORMATION

TECHNICAL FIELD

The present disclosure relates to methods and apparatus for streaming and recording audio information.

BACKGROUND

Conventional wireless microphones typically have a radio transmitter that transmits audio information to a nearby receiver unit or smartphone. For example, a Bluetooth microphone may receive audio information (for example, a user's voice information) and send the information, via a Bluetooth connection (as opposed to a physical connection), to another electronic device, such as a smartphone. Wireless microphones provide portability convenience and can be used, for example, in conducting voice calls with a smartphone or making videos with the smartphone.

SUMMARY

In various embodiments, an apparatus including a microphone simultaneously streams audio information to an external device and records the audio information in memory. The processor of the apparatus may be configured to detect an input for a first operation mode of a plurality of operation modes. The first operation mode may be an operation mode to connect between the apparatus and the external device. The processor may control a communicator to transmit the received audio information in real time to the external device. The processor may also control the memory to simultaneously store the audio information when the audio information is transmitted to the external device.

In various embodiments, the processor of the external device (such as an electronic device) may receive a selection for a first operation mode from the apparatus including a microphone. The first operation mode may include an operation mode to connect between the external device and the apparatus. The processor may activate a camera to capture visual information. The processor may also control a short-range radio communicator to receive audio information in real time from the apparatus including a microphone. The processor of the external device may output the received audio information in real time via a speaker and display the captured visual information on a screen of the electronic device. For example, the processor may synchronize the captured visual information and audio information, and output the synchronized visual information on a screen and audio information via a speaker. The processor may also control the short-range radio communicator to receive a generated audio backup data from the apparatus when a communication between the short-range radio communicator and the apparatus is completed. The processor may synchronize the generated audio backup data with the captured visual information. For example, the processor may identify whether the received audio information corresponds to the audio backup data. Then, the processor may utilize the audio backup data to fill in any audio crackles or dropouts of the received audio information.

DRAWINGS

DETAILED DESCRIPTION

The present disclosure relates to a wireless lavalier microphone that can be clipped to a user's shirt, such as a user generating content for social media platforms or video sites such as YouTube.com. The microphone receives audio information such as a user's voice (for example, an interviewer or interviewee's voice information). Then, the microphone both streams the audio information (for example, via Bluetooth) to an external device, such as a smartphone (for example, iPhone or Android phone) and records the audio information in an internal storage (for example, an embedded Secure Digital (SD) card). The external device also includes storage and records the streamed audio information. When the generation of audio information is completed (for example, the interviewer's interview with the interviewee is completed), the microphone sends an audio back-up file including the recorded audio information to the external device for the external device to synchronize with the streamed audio information. An advantage of the microphone recording and streaming at the same time is that the audio back-up file can fix any errors encountered during streaming, such as poor audio quality or dropouts. As a result, the microphone can provide improved audio quality.

Figure 1A:
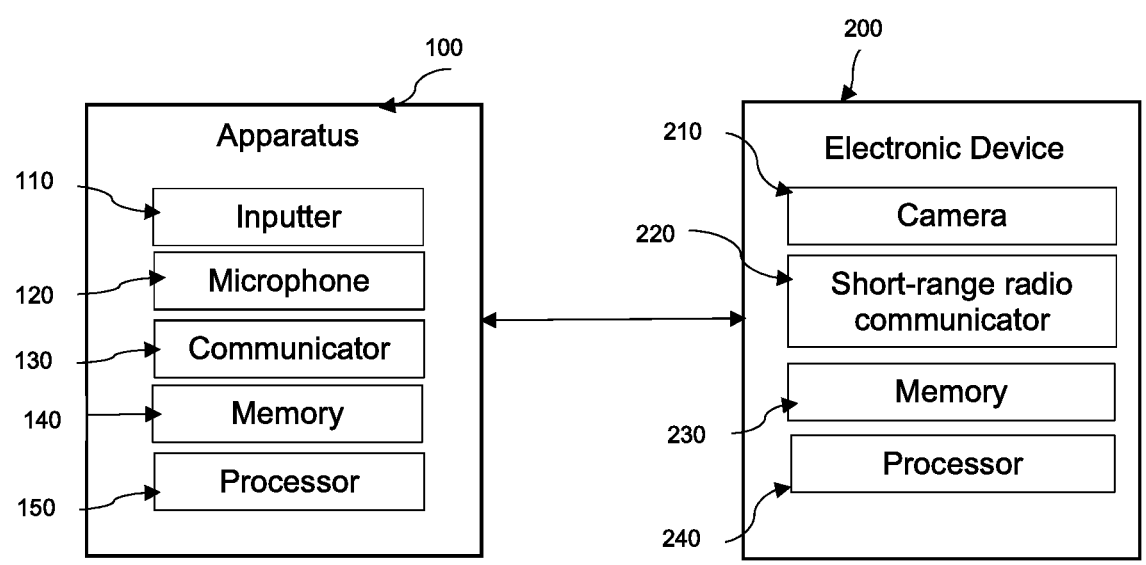
FIG. 1A shows a schematic illustration of an audio apparatus implementing one form of operation modes.

FIG. 1A shows a schematic illustration of an audio system in accordance with various embodiments. The apparatus 100 may establish a connection with an electronic device 200, such as a smartphone. For example, the apparatus 100 may be connected to a network through wireless or wired communication to communicate with the electronic device 200. The wireless communication may include at least one of, Wi-Fi, Bluetooth (BT), Near Field Communication (NFC), Global Positioning System (GPS) and cellular communication (e.g., Long Term Evolution (LTE), LTE-A, Code Division Multiple Access (CDMA), Wideband CDMA (WCDMA), Universal Mobile Telecommunication System (UMTS), Wireless Broadband (WiBro), and Global System for Mobile communication (GSM). The wired communication may include at least one of, a Universal Serial Bus (USB), a High Definition Multimedia Interface (HDMI), Recommended Standard 232 (RS-232), and a Plain Old Telephone Service (POTS).

In various embodiments, when a communicator 130 in the apparatus 100 and a short-range radio communicator 220 in the electronic device 200 are activated, the electronic device 200 may send a discovery signal for a Bluetooth device (for example, the apparatus 100) in the proximity thereof. The electronic device 200 may detect the Bluetooth activated device (for example, the apparatus 100), and an association protocol between the apparatus 100 and the electronic device 200 may be used to establish connectivity between them. This establishment of the association/connectivity between the apparatus 100 and the electronic device 200 is based on a wireless protocol, with Bluetooth being one example. After this connection, the apparatus 100 and the electronic device 200 are able to transfer data using an interface for any application specific exchange.

The apparatus 100 may include an inputter 110, microphone 120, communicator 130, memory 140, and processor 150. The apparatus 100 may be a wireless lavalier microphone that can be clipped to a user's shirt. In various embodiments, the inputter 110 may transfer commands or data input from a user to, for example, the communicator 130, the memory 140, or the processor 150. The inputter 110 may include a button group (for example, physical buttons such as pushbuttons/rocker buttons, dials, slider switches, joysticks, click wheels, or touch screen) for operating the apparatus 100. For example, the button group may include a main button performing an operation mode for connecting with the electronic device 200, power on/off, and a volume button for adjusting volume of the apparatus 100. In some embodiments, the inputter 110 may be configured to detect an input for at least one operation mode of a plurality of operation modes. The plurality of operation modes may include various operational ways to connect with the electronic device 200. For example, the electronic device 200 may connect with one apparatus 100 (as shown in FIG. 1) or multiple apparatuses (e.g. first apparatus 100, and second apparatus 300 shown in FIG. 2) based on the selected operation mode.

The microphone 120 may be configured to receive audio information from an external source. For example, the microphone 120 may receive audio information from a specific source, such as a user's voice information, or may record ambient audio information recorded from one or more sources.

In various embodiments, the communicator 130 may be configured to communicate with an external device, such as the electronic device 200, as discussed above. The communicator 130 may perform wireless communications (e.g. Bluetooth) with other wireless devices through an antenna (for example, a Bluetooth antenna, etc.) based on a wireless protocol, such as Bluetooth. The communicator 130 may process at least some information acquired from other elements (e.g., the inputter 110, the microphone 120, the memory 140, the processor 150). For example, based on a Bluetooth connection between apparatus 100 and the electronic device 200, the processor 150 may control communicator 130 to send the audio information to the electronic device 200.

The memory 140 may store a host stack administrating wireless/Bluetooth communications, wireless/Bluetooth profiles, and application programs which can be selected according to functions or conditions of external wireless/Bluetooth targets. In various embodiments, the memory 140 may be embedded in the apparatus 100. For example, the apparatus 100 may comprise embedded RAM and ROM, and/or a SD card (e.g., 8 gb, 10 gb, 12 gb, 14 gb, 16 gb, and so on). In some embodiments, the memory 140 may store instructions (software and/or firmware) for execution by the processor 150. The memory 140 also may allow the apparatus 100 to work as a standalone audio recorder, not relying on an external device 200.

In various embodiments, the processor 150 may identify an input for a first operation mode of the plurality of operation modes. The first operation mode may be an operation mode to connect between the apparatus 100 and the electronic device 200. The processor 150 may be configured to execute instructions stored in the memory 140 and to control the communicator 130. Further, the processor 150 may control the communicator 130 to transmit the received audio information in real time to the electronic device 200. The processor 150 may also control the memory 140 to simultaneously store the audio information when the audio information is transmitted to the electronic device 200, and to control the communicator 130 to transmit the stored audio information to the electronic device 200.

The processor 150 may be a hardware device that may be configured to execute one or more steps. Examples of the processor 150 may include, but are not limited to, a field-programmable gate array (FPGA), any integrated circuit (IC), and programmable read-only memory (PROM) chips. The memory 140 may be configured to store algorithmic steps and the processor 150 may be specifically configured to execute the algorithmic steps to perform one or more processes.

Furthermore, the processor 150 executing the algorithmic steps may be embodied as non-transitory computer readable media on a computer readable medium containing executable program instructions executed by a processor, a controller, or the like. Examples of computer readable media may include, but not limited to, ROM, RAM, computer disc (CD) ROMs, magnetic tapes, floppy disks, flash drives, smart cards, and optical data storage devices. The computer readable recording medium may also be distributed in network coupled computer systems so that the computer readable media are stored and executed in a distributed fashion.

In various embodiments, the processor 150 may be configured to generate audio backup data based on the stored audio information. For example, the processor 150 may control the memory 140 to store audio information from a starting time until an end time, and the stored audio information may then be transferred (e.g. sent wirelessly) to the electronic device 200. The starting time may be determined when the inputter 110 detects an input for connecting with the external device 200 or for initiating a receiving of audio information from an external source (for example, a user's voice information). The end time may be determined when the inputter 110 detects an input for terminating a transmission of the audio information to the electronic device 200 or for stopping receiving of audio information. The backup data may be updated or overwritten, as the audio information is stored from the starting time until the end time. For example, when the memory 140 stores the audio information from the starting time until 10 seconds thereafter, and further stores the audio information from 11 seconds to 12 seconds, a backup data generated from the starting time until 10 seconds thereafter may be updated or overwritten by a new backup data generated from the starting time until 12 seconds thereafter. The audio backup data may be used to fill in any audio crackles or dropouts of the received audio information.

In alternative embodiments, the processor 150 may be configured to control the communicator 130 to transmit the audio information in real time to at least one of a portable device, another audio apparatus, an earpiece or headphones.

Such wireless transmission of the audio information does not require the earpiece or headphones to be plugged into the microphone via a wire, which can be cumbersome. The user of the earpiece or headphones can hear the audio information captured by the apparatus 100 in real time so that the user can make adjustments to the audio, if necessary, such as changing the location of the apparatus 100 relative to location where the audio information is being adjusted, or changing the equalizer associated with the audio.

The electronic device 200 may include a camera 210, short-range radio communicator 220, memory 230, and processor 240. The electronic device 200 according to various embodiments of the present disclosure may be a device including a communication function. For example, the electronic device 200 may include but is not limited to at least one of a smartphone, a tablet Personal Computer (PC), a mobile phone, a video phone, desktop PC, a laptop PC, a netbook computer, a Personal Digital Assistant (PDA), a mobile medical appliance, and a wearable device (e.g., a Head-Mounted-Device (HMD) such as electronic glasses, electronic clothes, an electronic bracelet, an electronic necklace, an electronic accessory, electronic tattoos, or a smart watch).

According to some embodiments, the electronic device 200 may be a smart home appliance with a communication function. The smart home appliance as an example of the electronic device may include at least one of a television, a Digital Versatile Disk (DVD) player, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic picture frame. Further, the electronic device 200 according to various embodiments of the present disclosure is not limited to the aforementioned devices.

In various embodiments, the camera 210 may be configured to capture visual information. For example, the camera 210 may capture background image information and a user's face information. The short-range radio communicator 220 may be configured to communicate with the apparatus 100. The short-range radio communicator 220 may use wireless communications, such as Wi-Fi or Bluetooth (BT), as discussed above. For example, the short-range radio communicator 220 may use Bluetooth profiles that correspond to standards for technologies in which Bluetooth can be utilized, and allow devices supporting the same profile to be compatibly operated.

In various embodiments, the processor 240 may receive a selection for a first operation mode from the apparatus 100 including a microphone 120. The first operation mode may include an operation mode to connect between the apparatus 100 and the electronic device 200. In some embodiments, the processor 240 may control the camera 210 to capture the visual information. The processor 240 may control the short-range radio communicator 220 to connect with the apparatus 100. For example, the short-range radio communicator 220 may connect with the apparatus 100 wirelessly, such as via Bluetooth. In short, one embodiment includes a first operation mode which allows the microphone 120 to connect to the electronic device 200 via Bluetooth. When conducting interviews, the microphone 120 captures audio information (e.g., vocals, sounds, and the like) from the interviewer and interviewee in high quality, mixed together in stereo, and automatically synchronized with accompanying video information (e.g., video files, video clips, video recordings, and the like). More specifically, when two audio apparatuses (i.e., the first apparatus 100 and the second apparatus 300) are used simultaneously, both the first apparatus 100 and the second apparatus 300 are connected to the electronic device 200. The first apparatus 100 and the second apparatus 300 are streaming separately to the electronic device 200 via two individual connections. In some forms of the present disclosure, a different operation mode may be provided. For example, in a situation where there is a connectivity issue between the apparatus 100 and the electronic device 200, the microphone 120 may receive and store the audio information independently and then transmit the recorded audio information to the electronic device 200 when the connectivity issue is resolved, or a user is able to connect and upload the audio information to the electronic device 200. More details will be explained in connection with FIG. 1C and FIG. 1D.

The processor 240 may control the short-range radio communicator 220 to receive audio information from the apparatus 100. The processor 240 may output the received audio information via a speaker. The processor 240 may display the captured visual information on a screen of the electronic device 200. For example, the processor 240 may synchronize the visual information and audio information, and display the synchronized visual information on a screen and the audio information via the speaker. The audio to video synchronization may refer to a relative timing of audio and video parts. For example, digital or analog audio video streams or video files may contain some sort of synchronization mechanism, either in the form of interleaved video and audio data or by explicit relative timestamping of data. The processing of data may respect the relative data timing by stretching between or interpolation of received data.

The processor 240 may control the short-range radio communicator 220 to receive a generated audio backup data from the apparatus 100 when a communication between the short-range radio communicator 220 and the apparatus 100 is completed. The completion of the communication may be determined in response to receiving an input for disconnecting with the apparatus 100 or terminating the receiving of the audio information from the apparatus 100. Then, in some embodiments, the processor 240 may synchronize the generated audio backup data with the captured visual information. The processor 240 may also replace the received audio information with the audio backup data, and store the audio backup data in the memory 230.

Figure 1B:
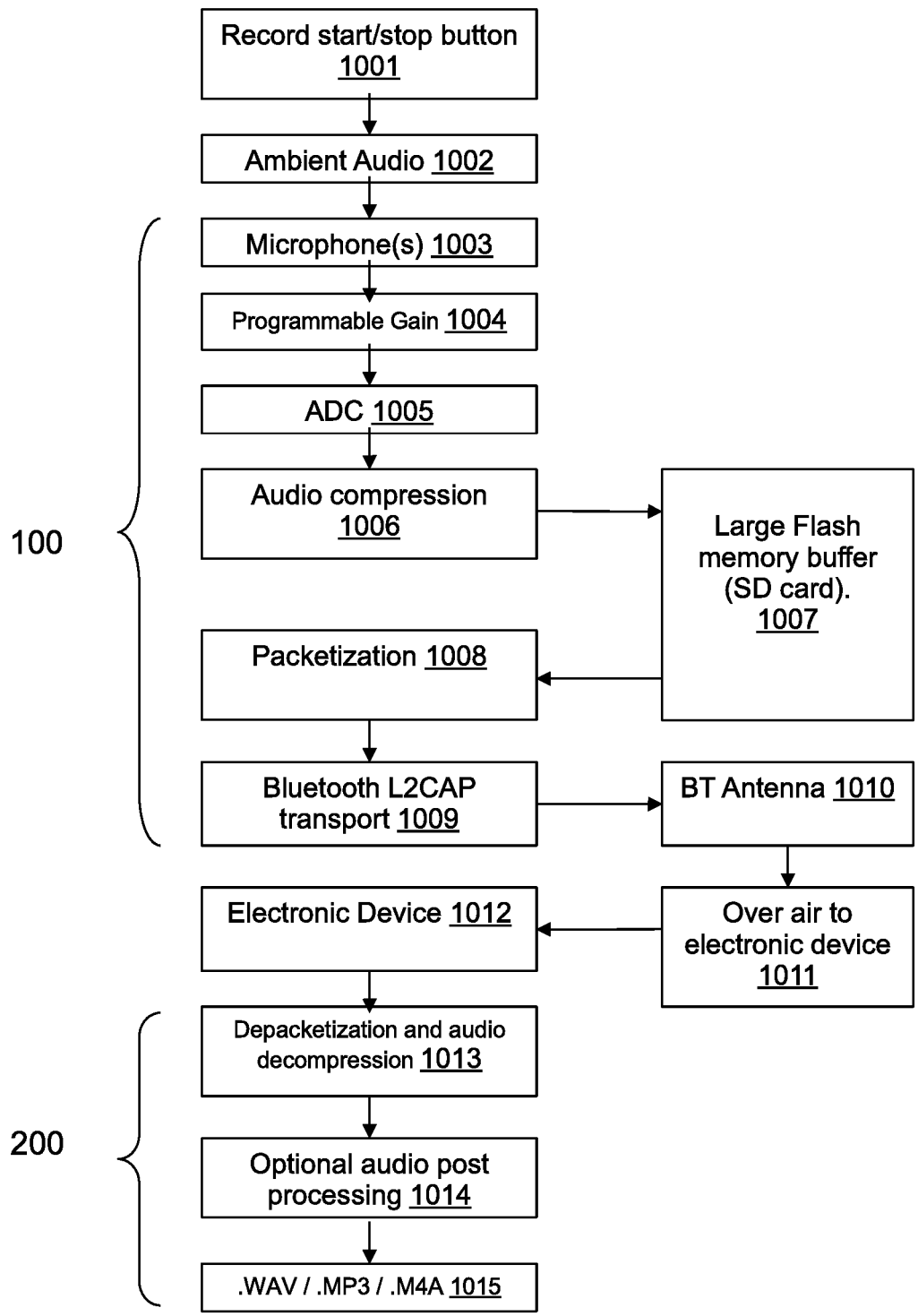
FIG. 1B illustrates steps of transmitting and outputting the audio information recorded by an audio apparatus per one operation mode in connection with FIG. 1A.

FIG. 1B illustrates steps of transmitting and outputting the audio information recorded by an audio apparatus 100 per one operation mode in connection with FIG. 1A in some forms of the present disclosure.

At 1001: An inputter 110 may receive an input for recording the audio information from a user. In some forms of the present disclosure, the inputter 110 may have different operation modes for a user to choose. For example, the inputter 110 may have a solo mode described in FIG. 1A. The solo mode may connect the apparatus 100 to the electronic device 200 via Bluetooth. Then, the electronic device 200 may record video information of an object and record the audio information associated with the video information. Additionally or alternatively, the electronic device 200 may ask the user to record the video information through an app associated with the electronic device 200.

At 1002/1003: the audio information may be recorded by the microphone 120. For example, the audio information may be captured in high quality, mixed together in stereo.

At 1004/1005/1006/1007/1008: the processor 150 may compress the audio information to reduce the data rate using an audio codec, which may lead to avoiding any packet loss.

For example, different packetization may be used corresponding to the type of electronic device 200 (e.g., iAP (iOS), SPP (Android)).

At 1009/1010/1011: After the packetization is completed, the audio information may be transferred to the electronic device 200 via an audio channel using Bluetooth.

At 1012/1013/1014/1015: upon receiving the audio information, the electronic device 200 may depacketize and decompress the audio information. Then, a proper format of the audio information may be output.

Figure 1C:
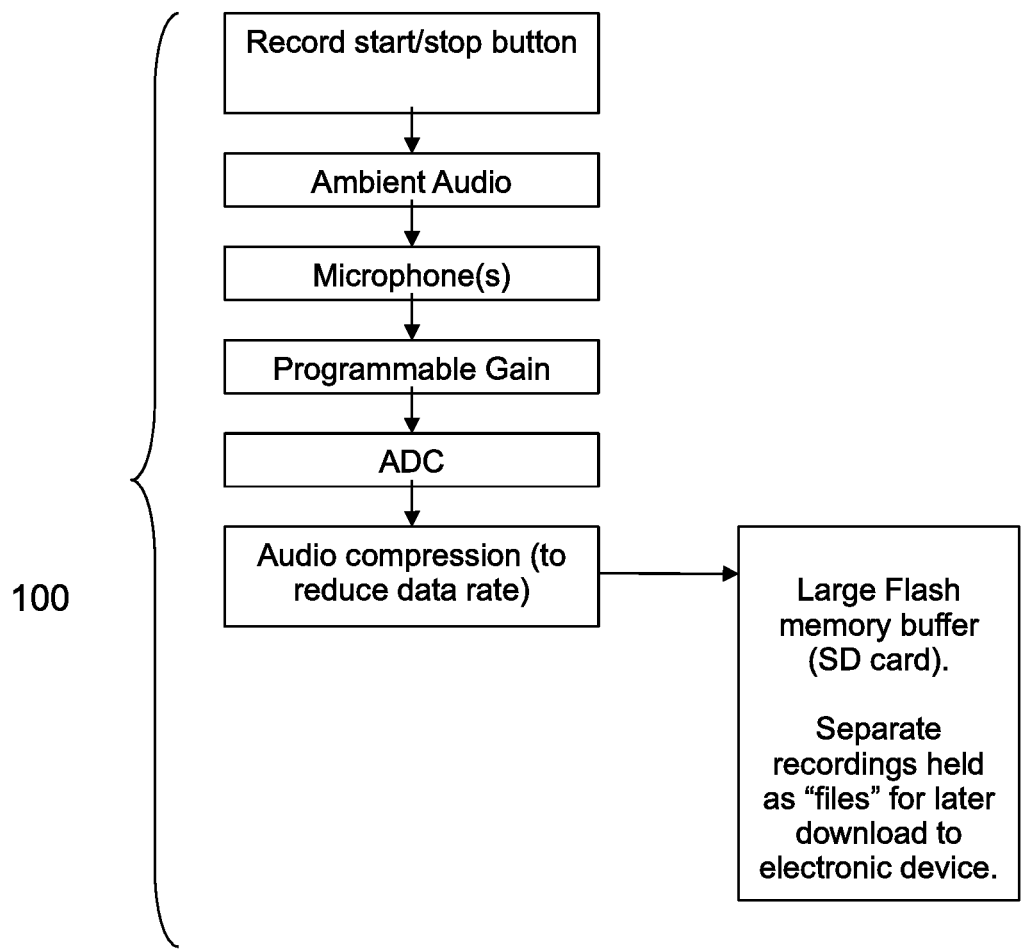
FIG. 1C illustrates steps of recording the audio information by an audio apparatus in another form of operation mode.

FIG. 1C illustrates steps of recording the audio information by an audio apparatus in another form of operation mode.

In a situation where a user records the audio information using the first apparatus 100, but doesn't have means to transmit the recorded audio information to the electronic device 200, the user may select this operation mode which enables the first apparatus 100 to record independently and store the recorded audio information. This particular operation mode called "Island Mode" then allows the user to transmit the stored audio information to the electronic device 200 when the connectivity issue is resolved.

The steps described in FIG. 1C mirror the steps described in FIG. 1B for the most part. As such, a detailed explanation may be omitted.

Figure 1D:
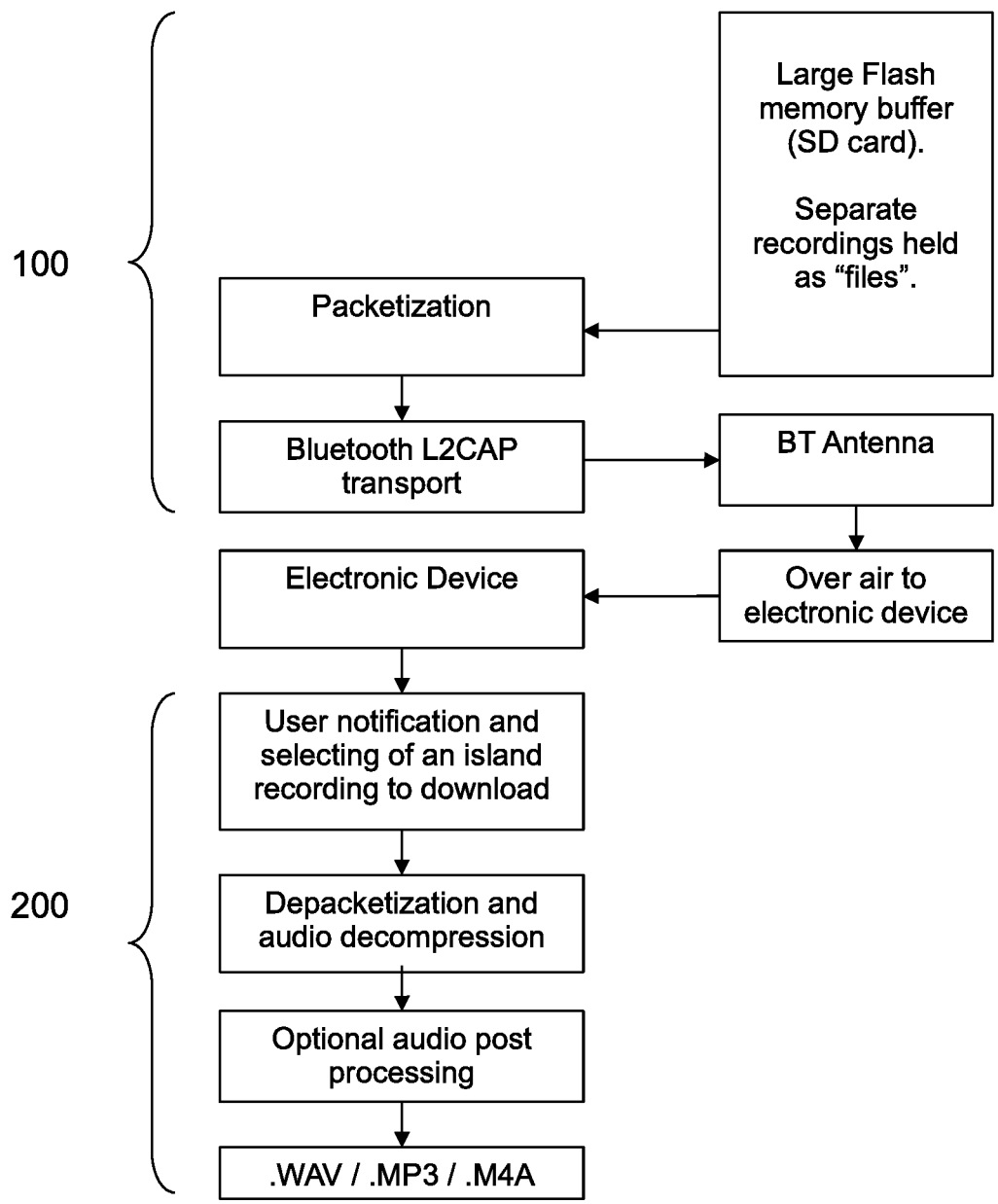
FIG. 1D illustrates steps of transmitting and outputting the audio information recorded by an audio apparatus in FIG. 1C.

FIG. 1D illustrates steps of transmitting and outputting the audio information recorded by an audio apparatus in FIG. 1C when the first apparatus 100 is connected to the electronic device 200.

Again, the steps described in FIG. 1D mirror the steps described in FIG. 1B. Therefore, a detailed explanation will be omitted.

Figure 2A:
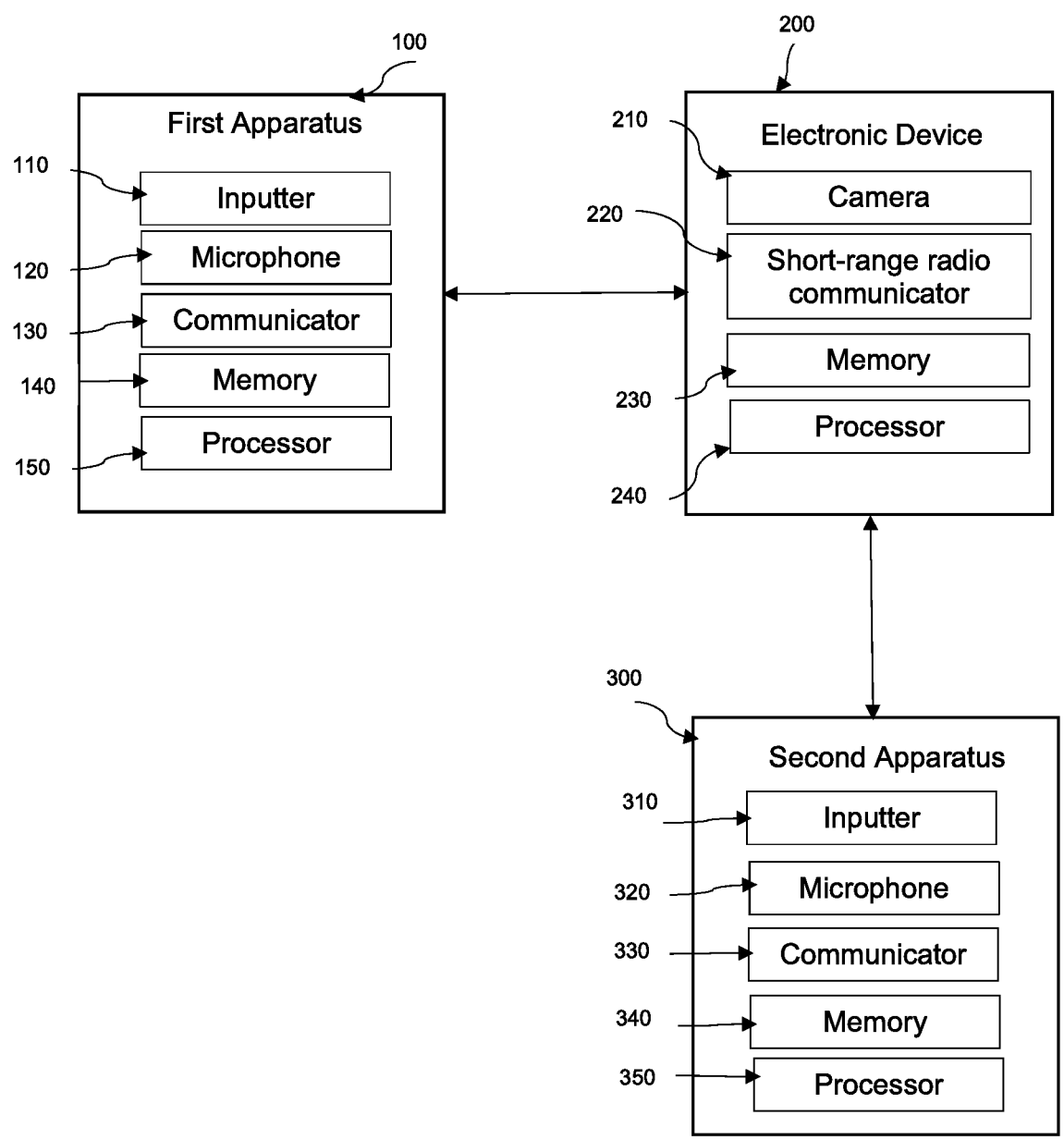
FIG. 2A shows another schematic illustration of an audio apparatus implementing another form of operation modes.

FIG. 2A shows another schematic illustration of an audio system in accordance with various embodiments. In various embodiments, the electronic device 200 may connect the first apparatus 100 (described above) and a second apparatus 300. The second apparatus 300 may be comparable to the first apparatus 100 in some embodiments, or may be a different type of apparatus in other embodiments. In one embodiment, the inputter 310 and the inputter 110, the microphone 320 and the microphone 120, the communicator 330 and the communicator 110, the memory 340 and the memory 140, and the processor 350 and the processor 150 may have the same structures and functions, respectively.

In various embodiments, the electronic device 200 may send a discovery signal for wireless/Bluetooth devices (for example, the first apparatus 100 and the second apparatus 300) in the proximity thereof. For example, the electronic device 200 may detect Bluetooth activated devices (for example, the first apparatus 100 and the second apparatus 300), and each association protocol for each of the first apparatus 100 and the second apparatus 300. This establishment of the association/connectivity between devices may be based on Bluetooth in one embodiment. After this connection, the first apparatus 100 and the electronic device 200 are allowed to transfer data using the Bluetooth interface for any application specific exchange. The second apparatus 300 and the electronic device 200 are also allowed to transfer data using the Bluetooth interface for any application specific exchange.

In various embodiments, the processor 150 may detect an input for a second operation mode of the plurality of operation modes. The second operation mode may refer to a connection between the electronic device 200 and the apparatuses (100, 300). For example, the processor 150 may be configured to select a profile of a standard protocol for the communicator 130. The standard protocol may be used in the Internet and similar computer networks. For example, the standard protocol may provide end-to-end data communication specifying how data should be packetized, addressed, transmitted, routed, and received. The communicator 130 may be compatible with a subset of wireless/Bluetooth profiles necessary to use the desired service (for example, a connection with the electronic device 200). The wireless/Bluetooth profiles may be a specification regarding an aspect of wireless/Bluetooth-based wireless communication between devices. In particular, the second operation mode allows the first apparatus 100 to act as a master device and the second apparatus 300 as a slave device, or vice versa. The master device will serve as a wireless microphone, whereas the slave device will serve as a receiver that may be plugged into a separate device via different types of connectors (e.g., 3.5 mm TRRS, 3.5 mm TRS, and the like).

In some embodiments, the processor 150 may select only one wireless/Bluetooth profile of the standard protocol. In one embodiment, the profile of the standard protocol may be Bluetooth Serial Port Profile (SPP). For example, the processor 150 may control the communicator 130 to transmit the received audio information in real time based on the selected profile (for example, the SPP) to the electronic device 200. As a result, the communicator 130 may connect a plurality of external devices (e.g., the first apparatus 100, the second apparatus 300, and other wireless/Bluetooth devices) by utilizing only the SPP profile. For example, if the apparatus 100 utilizes the Advanced Audio Distribution Profile (A2DP), Hands-Free Profile (HFP), and the SPP, the apparatus 100 cannot connect additional Bluetooth devices (e.g., Bluetooth headphones, or other devices).

The processor 150 may control the memory 140 to simultaneously store the audio information when the audio information is transmitted to the electronic device 200. The first apparatus 100 and the second apparatus 300 may further include an audio codec configured to compress the audio information and to transmit the audio information in real time to the external device (for example, the electronic device 200) based on an audio channel using the Bluetooth SPP. The communicator 130 may use the audio codec that streams the audio information via a single or dual channel (e.g., 16 bit 44.1 kHz, or 24 bit 48 kHz) to the electronic device 200. In some forms of the present disclosure, the audio compression and packetization may be required to reduce data rate in order to avoid any packet loss that is communicated via Bluetooth. When the electronic device 200 receives the compressed audio information, the electronic device 200 may perform depacketization and audio decompression. The depacketization and audio decompression may differ depending on the operating system on which the electronic device 200 is running. In some embodiments, the processor 150 and the processor 350 may stream the audio information via a dual-channel in order to capture and reproduce a binaural recording. For example, the first apparatus 100 may transmit the audio information to a left-earpiece and the audio information from the second apparatus 300 may transmit to a right-earpiece.

In various embodiments, the processor 240 of the electronic device 200 may receive an input for a second operation mode from the first apparatus 100 or the second apparatus 300. The second operation mode may be an operation mode to connect between the electronic device 200 and the apparatuses (100, 300). The processor 240 may control the short-range radio communicator 220 to establish a connection with the first apparatus 100 and the second apparatus 300. The processor 240 may control the short-range radio communicator 220 to receive a first audio information from the first apparatus 100 and a second audio information from the second apparatus 300. The processor 240 may synchronize the first audio information and second audio information received via dual audio channel. The processor 240 may synchronize audio information and the visual information.

In some forms of the present disclosure, a different operation mode may be provided as well. Specifically, the first apparatus may record audio from one source, while the second apparatus may record audio from a different source. For example, when the first apparatus 100 and the second apparatus 300 connect to the electronic device 200, a user may use the first apparatus 100 to record one interviewee, and use the second apparatus 300 to record another interviewee at the same time. Then, both the first apparatus 100 and the second apparatus 300 may transmit the recorded audio information to the electronic device 200 in real-time, and the electronic device 200 may integrate each of the recorded audio information into the recorded video automatically.

Figure 2B:
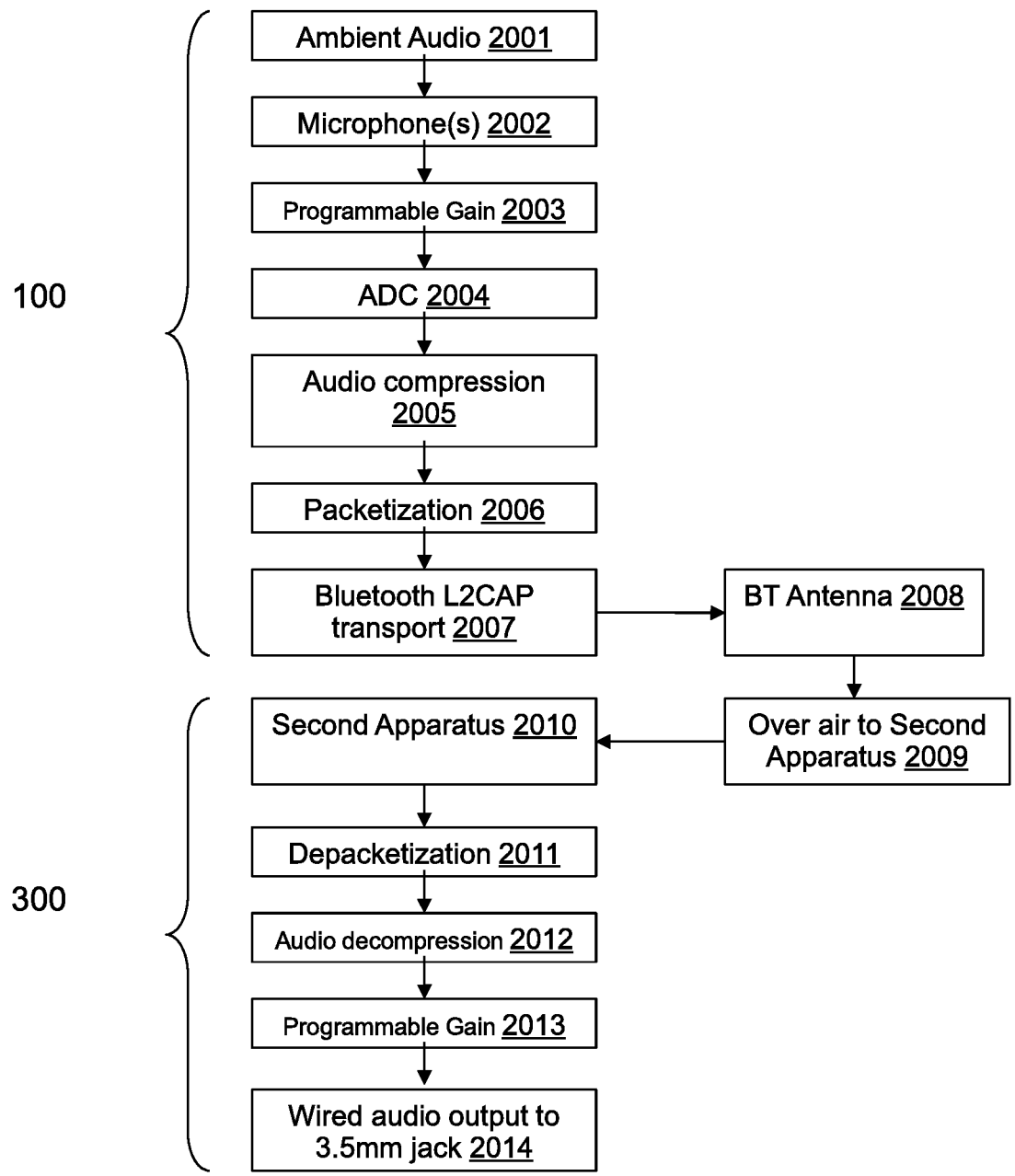
FIG. 2B illustrates steps of using two audio apparatuses per another operation mode in connection with FIG. 2A.

FIG. 2B illustrates steps of using two audio apparatuses (e.g., the first apparatus 100, and the second apparatus 300) per another operation mode in connection with FIG. 2A.

FIG. 2B describes a different operating mode than the mode described in FIG. 1B. In particular, FIG. 2B illustrates a receiver mode where the first apparatus 100 may act as a master apparatus (i.e., a wireless microphone), and the second apparatus 300 may act as a slave apparatus (i.e., a receiver plugging into a separate device).

At 2001/2002: An inputter 110 may receive an input for recording the audio information from a user. In some forms of the present disclosure, the inputter 110 may have different operation modes for a user to choose. Here, the user may choose the receiver mode. Then, the audio information may be recorded by the microphone 120. For example, the audio information may be captured in high quality, mixed together in stereo.

At 2003/2004/2005/2006: the processor 150 may compress the audio information to reduce the data rate using an audio codec, which may lead to avoiding any packet loss. For example, different packetization may be used corresponding to the type of electronic device 200 (e.g., iAP (iOS), SPP (Android)).

At 2007/2008/2009: After the packetization is completed, the audio information may be transferred to the second apparatus 300 via an audio channel using Bluetooth.

At 2010/2011/2012/2013/2014: upon receiving the audio information, the second apparatus 300 may depacketize and decompress the audio information. Then, a proper format of the audio information may be output to 3.5 mm jack.

Figure 3:
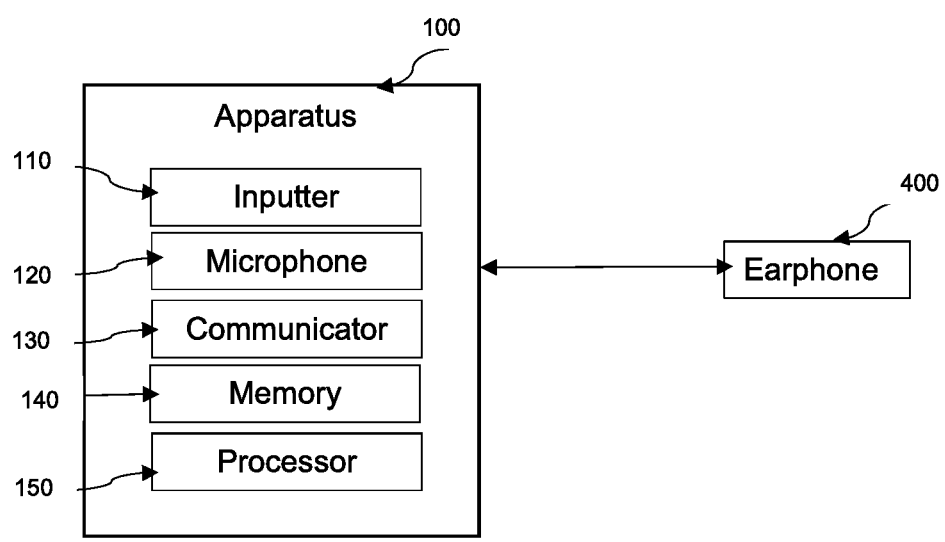
FIG. 3 shows another schematic illustration of an audio apparatus in one form of the present disclosure.

FIG. 3 shows another schematic illustration of an audio system in accordance with various embodiments. In various embodiments, the communicator 130 of the apparatus 100 may transmit the audio information to an earphone 400. For example, the communicator 130 may stream the audio information via a wireless protocol, such as Bluetooth, to an earpiece or headphones (in addition to streaming the audio information to the electronic device 200) so that the user can hear the audio information as it is being generated. Such wireless transmission of the audio information does not require the earpiece or headphone to be plugged into the microphone via a wire, which is cumbersome. The user of the earpiece or headphone can hear the audio information in real time.

Figure 4:
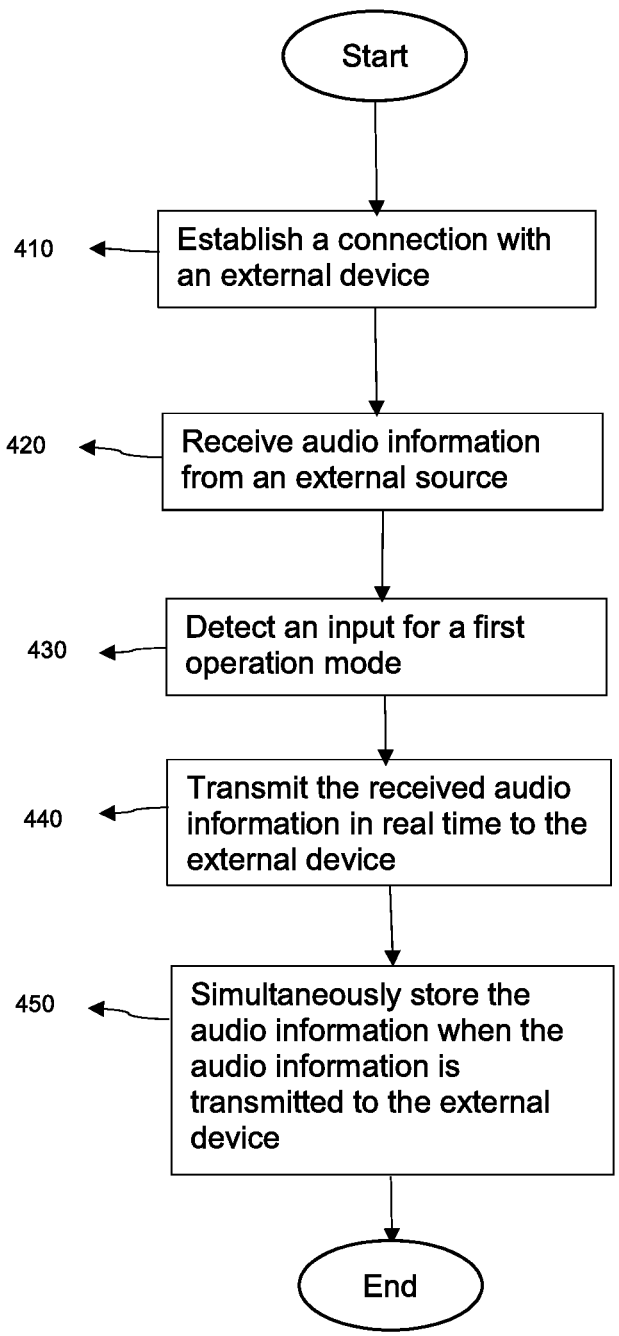
FIG. 4 shows a flow diagram corresponding to a method for streaming and recording audio information in one form of the present disclosure.

FIG. 4 shows a flow diagram corresponding to a method for streaming and recording audio information. At 410, the communicator 130 of the apparatus 100 may establish a connection with an external device (e.g., the electronic device 200). For example, the communicator 130 may be a short-range radio communication device (e.g., Bluetooth device). At 420, the microphone 120 may receive audio information from an external source (for example, ambient audio information and/or a user's voice information). At 430, the inputter 110 may detect an input for at least one operation mode of a plurality of operation modes. At 440, the communicator 130 may receive the audio information from the microphone 120. The communicator 130 may transmit the received audio information to an external device (e.g., the electronic device 200). At 450, the processor 150 may simultaneously store the audio information in the memory 140 when the audio information is transmitted to the external device (for example, the electronic device 200).

Figure 5:
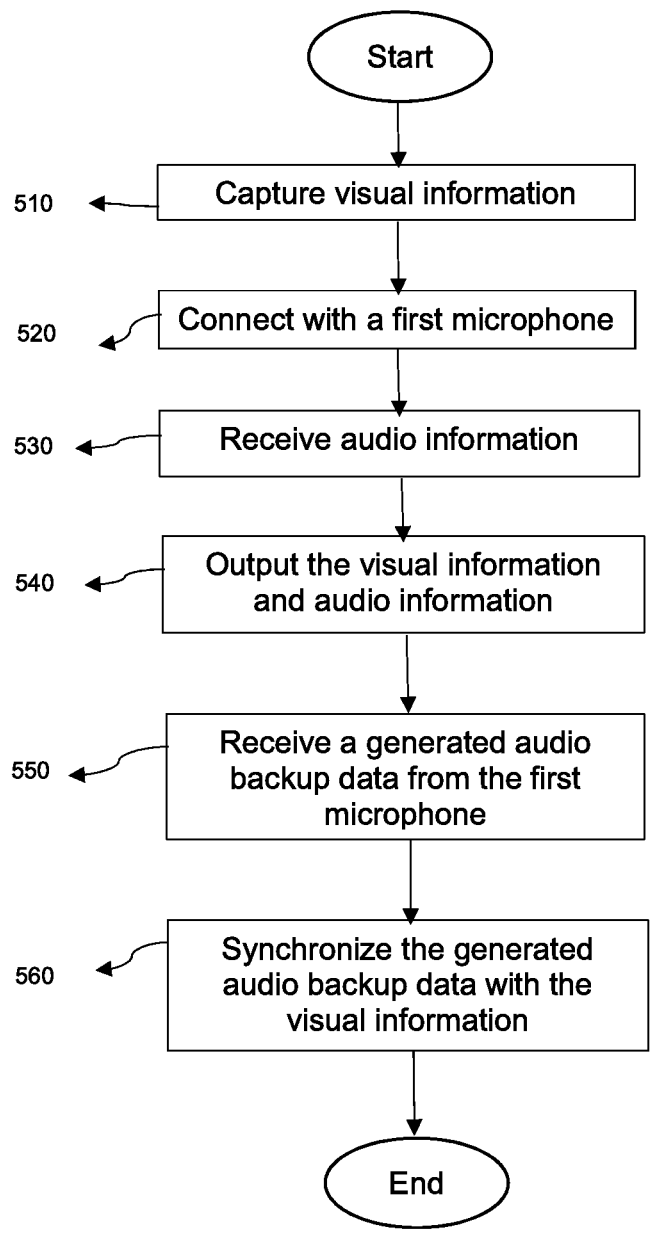
FIG. 5 shows a flow diagram corresponding to a method for synchronizing audio information in one form of the present disclosure.

FIG. 5 shows a flow diagram corresponding to a method for synchronizing audio information. At 510, the camera 210 may capture visual information. At 520, the short-range radio communicator 220 may connect with a first microphone (e.g., the apparatus 100). At 530, the short-range radio communicator 230 may receive audio information from the first microphone (e.g., the apparatus 100). At 540, the processor 240 may display the visual information on a screen of the electronic device 200. The processor 240 may output the audio information via a speaker. At 550, the short-range radio communicator 220 may receive a generated audio backup data from the the apparatus 100. In some forms of the present disclosure, the audio backup data may be generated by storing the audio information that is recorded by the apparatus 100. The audio backup data may be generated as the electronic device 200 starts recording the visual information. Here, the visual information may also include audio information of the same object ("second audio information"), but recorded by the electronic device 200. The audio information recorded by the apparatus 100 may be referred to as "first audio information." When the electronic device 200 stops recording the visual information, the electronic device 200 may transmit the second audio information to the apparatus 100. At 560, the processor 150 of the apparatus 100 may determine whether the first audio information matches the second audio information at a predetermined point of time by comparing a first amount of audio data included in the first audio information with a second amount of audio data included in the second audio information. If the processor 150 determines that the first audio information does not match the second audio information, then the processor 150 may synchronize the first audio information with the second audio information based on the first audio information stored in the memory 140. For example, if the first amount is greater than the second amount, then processor 150 may remove an extra amount of the first amount from the first audio information in order to synchronize the first audio information with the second audio information. In another example, if the first amount is less than the second amount, the processor 150 may identify the first audio information from the stored first audio information in the memory 140 corresponding to an extra amount of the second amount. Then, the processor 150 may add the identified the first audio information to the first audio information in order to synchronize the first audio information with the second audio information. However, if the first amount is equal to the second amount, then the processor 150 may notify the electronic device 200 that the first audio information matches the second audio information. The electronic device 200 then use the second audio information for output. In some forms of the present disclosure, additionally or alternatively, the synchronization feature of the processor 150 may be implemented in the processor 240 of the electronic device 200. Accordingly, due to the synchronization feature of the apparatus 100, the apparatus 100 may ensure a guaranteed dropout free experience to a user, while at the same time delivering at a faster transfer rate. However, in some forms of the present disclosure, the apparatus 100 may also be used as a standalone recording device and its recorded audio information may be transferred to the electronic device 200 not only on a real-time basis, but also whenever the user wants (e.g., the user may set a certain time to have the recorded audio information transferred to the electronic device 200 when a connection between the apparatus 100 and the electronic device 200 is stable, and the like).

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. Therefore, it is intended that claimed subject matter not be limited to the particular embodiments disclosed, but that such claimed subject matter can also include all embodiments falling within the scope of the appended claims, and equivalents thereof.

What is claimed is:

1. An apparatus comprising:
    an inputter configured to receive, from a user, an input for recording first audio information of an object;
    a microphone configured to receive, from an external source, the first audio information;
    a communicator configured to communicate with a device that is configured to record video information of the object, wherein the video information of the object includes second audio information of the object;
    non-transitory memory storing instructions; and
    a processor configured to execute the instructions to:
        in response to receiving the input, receive, from the microphone, the first audio information via the communicator;
        transmit, to the device, the first audio information when the device stops recording the video information;
        generate an audio backup data by storing the first audio information in the memory as the device starts recording the video information;
        receive, from the device, the second audio information when the device stops recording the video information;
        determine whether the first audio information matches the second audio information at a predetermined point of time by comparing a first amount of audio data included in the first audio information with a second amount of audio data included in the second audio information;
        in response to determining that the first audio information does not match the second audio information at the predetermined point of time, generate synchronized audio information by aligning the first audio information with the second audio information based on the stored first audio information; and
        transmit, to the device, the synchronized audio information.

2. The apparatus of claim 1, wherein, when the synchronized audio information is generated, the processor is configured to:
    when the first amount is greater than the second amount, adjust the first audio information corresponding to the second audio information by removing an extra amount of the first amount from the first audio information.

3. The apparatus of claim 1, wherein, when the synchronized audio information is generated, the processor is configured to:
    when the first amount is less than the second amount, adjust the first audio information corresponding to the second audio information by adding an extra amount of the second amount to the first audio information based on the stored first audio information.

4. The apparatus of claim 1, wherein, when the synchronized audio information is generated, the processor is configured to:
    when the first amount is equal to the second amount, notify the device that the first audio information matches the second audio information such that the device uses the second audio information for output.

5. The apparatus of claim 1, wherein the processor is configured to:
    transmit, via the communicator, the synchronized audio information to the device including a portable device, an audio device, an earpiece, and headphones.

6. The apparatus of claim 1, wherein the communicator is a short-range radio communication device.

7. The apparatus of claim 1, wherein the processor is further configured to:
    select a profile of a standard protocol from among a plurality of profiles of the standard protocol for the communicator; and
    transmit, to the device, the synchronized audio information based on the selected profile.

8. The apparatus of claim 7, wherein the profile of the standard protocol is Bluetooth Serial Port Profile (SPP).

9. The apparatus of claim 1, wherein the processor is further configured to:
    compress the first audio information using an audio codec; and
    transmit, to the device, the compressed first audio information.

10. The apparatus of claim 1, wherein, when the input is received, the inputter is further configured to:
    receive, from the user, an input for selecting at least one operation mode of a plurality of operation modes,
    wherein each operation mode is different based on a number of apparatuses connected to the device, whether the apparatus is connected to the device, the number of apparatuses used at a predetermined time, and a role of the apparatus.

11. A method comprising:
    receiving, by an inputter, an input for recording first audio information of an object from a user;
    receiving, by a microphone, the first audio information from an external source;
    communicating, by a communicator, with a device that is configured to record video information of the object, wherein the video information of the object includes second audio information of the object;
    in response to receiving the input, receiving, from the microphone, the first audio information;
    transmitting, to the device, the first audio information when the device stops recording the video information;
    generating an audio backup data by storing the first audio information in memory as the device starts recording the video information;
    receiving, from the device, the second audio information when the device stops recording the video information;

determining, by a processor, whether the first audio information matches the second audio information at a predetermined point of time by comparing a first amount of audio data included in the first audio information with a second amount of audio data included in the second audio information;

in response to determining that the first audio information does not match the second audio information at the predetermined point of time, generating, by the processor, synchronized audio information by aligning the first audio information with the second audio information based on the stored first audio information; and transmitting, to the device, the synchronized audio information.

12. The method of claim 11, wherein, when the generation of the synchronized audio information further includes:

when the first amount is greater than the second amount, adjusting the first audio information corresponding to the second audio information by removing an extra amount of the first amount from the first audio information.

13. The method of claim 11, wherein, when the generation of the synchronized audio information further includes:

when the first amount is less than the second amount, adjusting the first audio information corresponding to the second audio information by adding an extra amount of the second amount to the first audio information based on the stored first audio information.

14. The method of claim 11, wherein, when the synchronized audio information is generated, the processor is configured to:

when the first amount is equal to the second amount, notify the device that the first audio information matches the second audio information such that the device uses the second audio information for output.

15. The method of claim 11, wherein the transmission of the synchronized audio information includes:

transmitting the synchronized audio information to the device including a portable device, an audio device, an earpiece, and headphones.

16. The method of claim 11, wherein the communicating with the device includes:

communicating, by a short-range radio communication device, with the device.

17. The method of claim 11, wherein the method further comprises:

selecting a profile of a standard protocol from among a plurality of profiles of the standard protocol for the communicator; and transmitting, to the device, the synchronized audio information based on the selected profile.

18. The method of claim 17, wherein the selecting of the profile of the standard protocol includes:

selecting Bluetooth Serial Port Profile (SPP).

19. The method of claim 11, wherein the method further comprises:

compressing the first audio information using an audio codec; and transmitting, to the device, the compressed first audio information.

20. The method of claim 11, wherein the receiving of the input further includes:

receiving, from the user, an input for selecting at least one operation mode of a plurality of operation modes, wherein each operation mode is different based on a number of apparatuses connected to the device, whether the apparatus is connected to the device, the number of apparatuses used at a predetermined time, and a role of the apparatus.

* * * * *